US006281963B1

(12) United States Patent
Takahata et al.

(10) Patent No.: US 6,281,963 B1
(45) Date of Patent: Aug. 28, 2001

(54) IMAGE FORMING APPARATUS

(75) Inventors: Toshiya Takahata; Takehiko Okamura; Hiroshi Ito, all of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/273,728

(22) Filed: Mar. 22, 1999

(30) Foreign Application Priority Data

| | | |
|---|---|---|
| Mar. 24, 1998 | (JP) | 10-095367 |
| Mar. 31, 1998 | (JP) | 10-103860 |
| Mar. 31, 1998 | (JP) | 10-103861 |

(51) Int. Cl.[7] .......... G03B 27/52; G03B 27/32; G03B 27/72; G03B 15/00; G03G 15/16

(52) U.S. Cl. .......... 355/41; 355/23; 355/24; 355/35; 399/43; 399/44; 399/45; 399/66

(58) Field of Search .......... 355/23, 24, 35, 355/41; 399/43, 44, 45, 66

(56) References Cited

U.S. PATENT DOCUMENTS

| | | | |
|---|---|---|---|
| 5,005,049 | 4/1991 | Matsushita | 355/208 |
| 5,335,048 * | 8/1994 | Takano et al. | 355/204 |
| 5,499,079 * | 3/1996 | Kinoshita et al. | 355/208 |
| 5,907,740 * | 5/1999 | Nozawa | 399/43 |

FOREIGN PATENT DOCUMENTS

| | | | |
|---|---|---|---|
| 62 287271 | 12/1987 | (JP) . | |
| 02 285377 | 11/1990 | (JP) . | |
| 2-285377 | 11/1990 | (JP) | G03G/15/16 |
| 7-50361 | 5/1995 | (JP) | G03G/15/16 |
| 7-82271 | 9/1995 | (JP) | G03G/15/16 |
| 07 175287 | 11/1995 | (JP) . | |
| 10 293433 | 11/1998 | (JP) . | |

* cited by examiner

*Primary Examiner*—Russell Adams
*Assistant Examiner*—Khaled Brown
(74) *Attorney, Agent, or Firm*—Sughrue, Mion, Zinn, Macpeak & Seas, PLLC

(57) ABSTRACT

An image forming apparatus for forming an image on both of a first side and a second side which are the right side and the back side of recording material, which comprises an image carrier on the surface of which a toner image is formed, a transfer member for forming a transfer part between the transfer member and the image carrier to transfer the toner image on the image carrier onto the recording material, a transfer voltage applying section for applying transfer voltage to the transfer member, a fixing member for heating the recording material, on which the toner image is transferred by the transfer member, passed therethrough to fix the toner image on the recording material, a reversing path for reversing the two sides of the recording material passed through the fixing member and returning the reversed recording material to the transfer part again, a timer section for measuring elapsed time since the recording material, on the first side of which a toner image is transferred, passes through the fixing member until the transfer of a toner image on the second side is started when an image is formed on the first and second sides of the recording material, a humidity detecting section for detecting humidity, and a control section for selecting transfer voltage for transferring a toner image on the second side of the recording material based upon elapsed time measured by the timer section and humidity detected by the humidity detecting section.

21 Claims, 5 Drawing Sheets

IMAGE FORMING APPARATUS

BACKGROUND OF THE INVENTION

The present invention relates to an image forming apparatus such as a printer, a facsimile and a copying machine for forming an image on recording material such as paper using electrophotography. Particularly, the present invention relates to technique for controlling transfer voltage in an image forming apparatus for forming an image on both sides of recording material.

In addition, the present invention relates to a color image forming apparatus such as a printer, a facsimile and a copying machine for forming a color image on recording material such as paper using electrophotography. Particularly, the present invention relates to transfer technique for transferring a toner image on recording material.

Generally, an image forming apparatus for forming an image on recording material such as paper using electrophotography is provided with an image carrier on the surface of which a toner image is formed, transfer member for forming a transfer part between the transfer member and the image carrier, applying transfer voltage and transferring the toner image on the surface of the image carrier on the recording material and fixing member for heating the recording material, passing the recording material on which the toner image is transferred by the transfer member and fixing the toner image on the recording material.

In such an apparatus, as the resistance value of recording material also differs when the hygroscopic degree of the recording material such as paper differs by the change of ambient temperature and humidity, the suitable value of transfer voltage when a toner image is transferred on the recording material also differs. In this connection, there is known an apparatus provided with humidity detector to determining the optimum value of transfer voltage when a toner image is transferred on the recording material according to humidity.

And there is also known an image forming apparatus, disclosed in Unexamined Japanese Patent Publication No. 2-285377A, in which transfer voltage is controlled under constant current with the minimum voltage and the maximum voltage limited so as to always enable stable transfer in any environment independent of the change of the characteristic of transfer material and the type of transfer material.

Besides, as the recording material is normally held with it laminated in a paper feeder and others and such a paper feeder and others are constituted so that the uppermost recording material is first fed, the uppermost recording material is most influenced by humidity (the hygroscopic degree is most increased).

Heretofore, the above point is noticed and there is proposed a technique, disclosed in Japanese Patent Publication No. 7-082271B, which enables detecting humidity by a humidity detector, measuring an interval between each recording, that is, between each fed recording material (for example, time until the next recording material is fed since the uppermost recording material of laminated recording material is fed) and determining transfer voltage based upon the above humidity and the above interval.

Recently, a demand for forming an image not only on one side of recording material but on both sides increases.

The formation of an image on both sides of recording material can be realized by transferring a toner image on the first side (for example, the right side) in a transfer part, reversing the two sides of recording material on which the toner image is fixed after the recording material passes fixing member, returning the recording material to the transfer part again, also transferring and fixing a toner image on the second side (for example, the back side).

However, it is found that if a toner image is formed on both sides of recording material, the optimum value of transfer voltage in transferring on the first side and the optimum value of transfer voltage in transferring on the second side are greatly different.

Though recording material does not pass fixing member yet in transferring on the first side, the recording material already passes the fixing member once in transferring on the second side and as fixing member heats recording material and fixes a toner image on the recording material, not only the hygroscopic degree of recording material immediately after the recording material passes fixing member approaches zero substantially but the recording material is in a state extremely sensitively influenced by humidity.

In such a situation, the related art disclosed in the above Japanese Patent Publication No. 7-082271B does not function effectively. Because the above related art can function only in case an image is formed only on one side.

Recently, a demand for forming a color image using toner in plural colors increases. Such a color image can be formed by superposing toner images in plural colors. In such a case, as toner images in plural colors are required to be transferred when a color image is transferred, a range of the suitable values of the above transfer voltage is small.

As in Japanese Patent Publication No. 7-050361B, there is proposed a color image forming apparatus in which recording material such as paper is wound and held on a drum and toner images in plural colors are directly and sequentially superposed on the recording material is proposed. In the color image forming apparatus, three areas divided based upon ambient temperature and humidity, that is, a low-temperature and low-humidity environmental area (I), a normal-temperature and normal humidity environmental area (II) and a high-temperature and high-humidity environmental area (III) are set, an optimum transfer current value is set every area in a table beforehand, a signal from detector for detecting temperature and humidity is converted from analog to digital, an optimum transfer current value in the above table is selected based upon the output, and transfer is executed based upon the transfer current value.

As the above color image forming apparatus disclosed in Japanese Patent Publication No. 7-050361B is constituted so that recording material such as paper is wound and held on the drum and toner images in plural colors are directly and sequentially superposed on the recording material, there is a drawback that a member for winding and holding recording material on the drum and a member for releasing winding and separating the recording material from the drum are required and thereby the constitution is complicated.

The above drawback can be solved by using constitution that toner images in plural colors are sequentially superposed on the surface of an image carrier and the superposed toner images in plural colors are collectively transferred on recording material. According to the above constitution, recording material is not required to be wound and held on a drum and therefore, winding is also not required to be released.

However, in the case of such constitution, that is, if toner images in plural colors superposed on the surface of an image carrier are collectively transferred on recording material, it is found that a satisfactory transfer condition may not necessarily be obtained depending upon the above any related arts. That is, it is found that a satisfactory transfer condition may not be obtained only by controlling transfer voltage under constant current with the minimum voltage and the maximum voltage limited and a satisfactory transfer condition may not be obtained only by setting an optimum transfer current value beforehand every area divided based upon temperature and humidity and selecting a transfer current value based upon temperature and humidity.

It is also found that as superposed toner images in plural colors were collectively transferred if toner images in plural colors superposed on the surface of an image carrier were collectively transferred on recording material, a range of transfer conditions under which a satisfactory transfer condition can be obtained was very small. Therefore, the inventors also found that it was influenced not only by environment and the type of recording material but by the dispersion of the resistance of a member forming a path through which transfer voltage was supplied whether a transfer condition was satisfactory or not.

According to the above related art, as there is naturally a limit in the precision of the detector and A/D conversion, an optimum transfer current value according to temperature and humidity may not necessarily be selected if the temperature and/or humidity are/is in the vicinity of a boundary between areas. For example, if temperature and humidity are in the vicinity of a boundary with the area (I) though actual temperature and humidity are in the area (II), an optimum transfer current value corresponding to the area (I) may be selected and if the above temperature and humidity are in the vicinity of a boundary with the area (III), an optimum transfer current corresponding to the area (III) may be selected. In such cases, as transfer is executed using a current value different from an optimum transfer current value to be selected originally, transfer failure occurs.

For a method of improving such a situation, the following methods are conceivable:

(1) A method of increasing the number of bits converted from analog to digital and the capacity of the table.

For example, temperature and humidity are expressed by each 8-bit and a table with capacity corresponding to 256×256 types of data is generated.

(2) A method of executing A/D conversion with high resolution (for example, 8-bit) and generating a table corresponding to only data for a high order few bits.

For example, if a table corresponding to only data for high order 3-bit is generated, a table with capacity corresponding to 8×8 types of data has only to be generated.

(3) A method of processing temperature and humidity data converted from analog to digital by operation without referring to a table and determining a transfer current value.

However, as the capacity of the table is too large according to the method (1), the method (1) is not desirable.

As 8-bit are only simply converted to 3-bit for example according to the method (2), an error of detection is increased in a nonlinear system.

As complicated calculation is required in a nonlinear system according to the method (3), table conversion is sometimes used in the process of the calculation in the end and is not efficient.

SUMMARY OF THE INVENTION

The present invention is made to solve the above problems. It is therefore the first object of the present invention to provide an image forming apparatus in which suitable transfer voltage is also obtained when an image is formed on the second side of recording material.

The second object of the present invention is to provide a color image forming apparatus adopting constitution that toner images in plural colors superposed on the surface of an image carrier are collectively transferred on recording material in which a satisfactory transfer condition can be obtained independent of environment.

The third object of the present invention is to provide a color image forming apparatus in which a satisfactory transfer condition is obtained according to the state of temperature and humidity without increasing the capacity of a table.

In order to achieve the above objects, there is provided an image forming apparatus for forming an image on both of a first side and a second side which are the right side and the back side of recording material, comprising: an image carrier on the surface of which a toner image is formed; a transfer member for forming a transfer part between the transfer member and the image carrier to transfer the toner image on the image carrier onto the recording material; a transfer voltage applying section for applying transfer voltage to the transfer member; a fixing member for heating the recording material, on which the toner image is transferred by the transfer member, passed therethrough to fix the toner image on the recording material; a reversing path for reversing the two sides of the recording material passed through the fixing member and returning the reversed recording material to the transfer part again; a timer section for measuring elapsed time since the recording material, on the first side of which a toner image is transferred, passes through the fixing member until the transfer of a toner image on the second side is started when an image is formed on the first and second sides of the recording material; a humidity detecting section for detecting humidity; and a control section for selecting transfer voltage for transferring a toner image on the second side of the recording material based upon elapsed time measured by the timer section and humidity detected by the humidity detecting section.

Accordingly, the recording material on the first side of which a toner image is transferred and fixed by passing through the fixing member is returned to the transfer part again through the reversing path, and hereby a toner image can be also transferred on the second side and fixed. That is, an image can be formed on both sides of the recording material.

Further, transfer voltage when a toner image is transferred on the second side of recording material can be set to an optimum value according to the hygroscopic degree of recording material which may rapidly vary depending upon the above elapsed time and humidity by the control section.

Therefore, when an image is formed on the second side of recording material, suitable transfer voltage is also obtained and as a result, a fine image can be also formed on the second side.

It may be configured that: the control section also selects transfer voltage for transferring a toner image on the first side of the recording material based upon humidity detected by the humidity detecting section.

Accordingly, transfer voltage when a toner image is transferred on the first side can be also set to an optimum value.

In addition, as a humidity detector for determining transfer voltage when a toner image is transferred on the first side and a humidity detector for determining transfer voltage when a toner image is transferred on the second side are shared, effect that one humidity detecting section has only to be provided is obtained.

It may be configured that: the humidity detecting section is located opposite to the reversing path.

Accordingly, transfer voltage when a toner image is transferred on the second side of recording material can be more securely set to an optimum value according to the hygroscopic degree of recording material which may rapidly vary depending upon the above elapsed time and humidity.

It may be configured that: the image forming apparatus further comprises a second humidity detecting section separately provided from the humidity detecting section, and wherein the control section selects transfer voltage for transferring a toner image on the first side of the recording material based upon humidity detected by the second humidity detecting section.

Accordingly, both transfer voltage when a toner image is transferred on the first and second sides of recording material can be more securely set to an optimum value, respectively.

It may be constituted that: toner images in plural colors superposed on the surface of the image carrier by rotating the image carrier in plural times, and the superposed toner images in plural colors are collectively transferred onto the recording material at the transfer part.

Accordingly, not only a monochrome image but a full color image can be formed on the first and second sides of recording material.

In addition, a color image can be formed with simple constitution, compared with an apparatus of a type that recording material is wound on a drum.

In such a case, elapsed time since the recording material on the first side of which a toner image is transferred passes fixing member until the transfer of a toner image on the second side is started remarkably differs according to difference in the rotating speed of the above image carrier between a case that a monochrome toner image is transferred on the second side of recording material and a case that toner images in plural colors superposed on the image carrier are collectively transferred and therefore, the hygroscopic degree of recording material may also remarkably differ.

In the meantime, according to the image forming apparatus, suitable transfer voltage when a toner image is transferred on the second side of recording material can be also obtained in such a case and as a result, a fine monochrome image or a fine full color image can be also formed on the second side.

It may be configured that: the image forming apparatus further comprises a temperature detecting section for detecting temperature, and wherein the control section selects the transfer voltage based upon temperature detected by the temperature detecting section in addition to the elapsed time and the humidity.

Accordingly, the above transfer voltage when a toner image is transferred on the recording material can be more securely set to an optimum value.

It may be configured that: the transfer voltage applying section applies transfer voltage in which at least one of the maximum voltage value and the minimum voltage value is limited under a constant current value to the transfer member, and the control section controls the constant current value and at least one of the maximum voltage value and the minimum voltage value based upon temperature detected by the temperature detecting section and the humidity detected by the humidity detecting section.

Accordingly, a satisfactory transfer condition can be obtained independent of environment, that is, temperature and humidity, the type of recording material and further, the dispersion of the resistance of a member forming a path through which transfer voltage is supplied.

It may be configured that: image forming apparatus further comprises: a transfer voltage table including proper transfer voltage values respectively corresponding to temperature value detected by the temperature detecting section and humidity value detected by the humidity detecting section; a first A/D converter for converting an analog signal output from the humidity detecting section into a digital signal; a second A/D converter for converting an analog signal output from the temperature detecting section into a digital signal; and a bit conversion section for outputting a digital signal in which bit number of the digital signal output from the first and second A/D converters is reduced with reference to a bit conversion table, wherein the control section selects a proper transfer voltage value in the transfer voltage table based upon the output of the bit conversion section. The bit conversion table includes data adapted to nonlinear system environment.

Accordingly, a satisfactory transfer condition is obtained according to the state of temperature and humidity and as a result, a satisfactory color image is obtained.

Further, as the above bit conversion section does not simply reduce and output the number of bits of a digital signal from the A/D converters but reduces and outputs it by referring to the bit conversion table, proper transfer voltage according to temperature and humidity is also precisely selected even in a nonlinear system environment without increasing the capacity of the table.

That is, a satisfactory transfer condition is obtained according to temperature and humidity without increasing the capacity of the table.

It may be configured that: the data included in the bit conversion table is configured so as to allow a detection error value corresponding to a required detection precision.

Accordingly, the selection suitable for an actual situation of transfer voltage can be enabled.

DETAILED DESCRIPTION OF THE PREFERRED EMBODIMENTS

Referring to the accompanying drawings, preferred embodiments of the present invention will be described below in detail.

Figure 1:
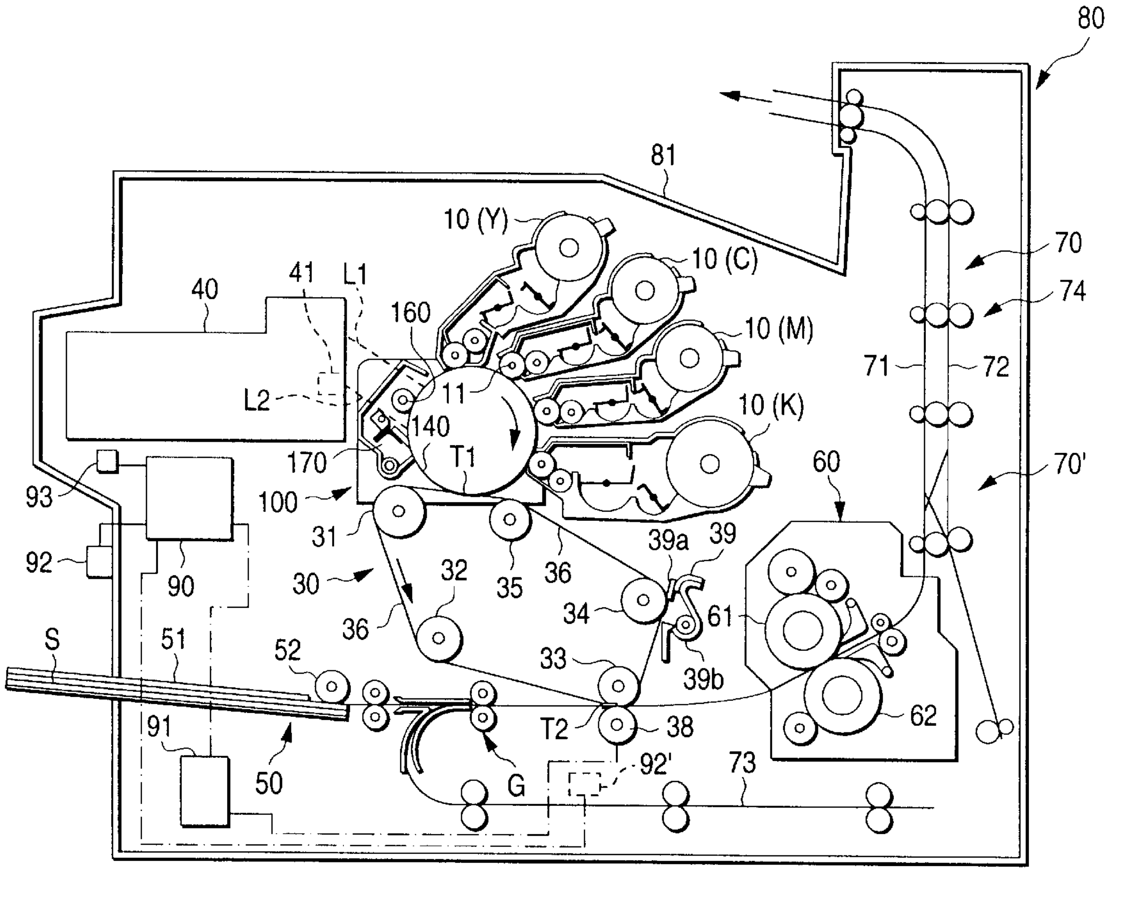
FIG. 1 is a schematic drawing showing one embodiment of an image forming apparatus according to the present invention.

FIG. 1 is a schematic drawing showing a first embodiment of an image forming apparatus according to the present invention and a second embodiment described later.

First, the outline of the image forming apparatus will be described.

The image forming apparatus can form a monochrome image and a full color image using developing machines for toner in four colors of yellow (Y), cyan (C), magenta (M) and black (K).

As shown in FIG. 1, a reference number 100 denotes a photosensitive body cartridge and a photosensitive body 140 is rotated in a direction shown by an arrow by a suitable driving member not shown.

The photosensitive body 140 is provided with thin cylindrical conductive base material and a photoconductive layer formed on the surface.

An charging roller 160 as a charging member, developing machines 10 (Y, C, M, K) as a developing member, an intermediate transfer mechanism 30 and a cleaning member 170 are arranged around the photosensitive body 140 in the direction of the rotation.

The charging roller 160 comes in contact with the periphery of the photosensitive body 140 and evenly charges the periphery. Selective exposure L1 according to desired image information is applied to the periphery of the evenly charged photosensitive body 140 by an exposure unit 40 and an electrostatic latent image is formed on the photosensitive body 140 by the exposure L1.

Toner is applied to the electrostatic latent image by the developing machine 10 to develop it.

For the developing machine, a developing machine for yellow 10Y, a developing machine for cyan 10C, a developing machine for magenta 10M and a developing machine for black 10K are provided. These developing machines 10Y, 10C, 10M and 10K are constituted so that they can be reciprocated and only the developing roller 11 of one developing machine can selectively come in contact with the photosensitive body 140. Therefore, these developing machines 10 apply any of yellow, cyan, magenta and black toner to the surface of the photosensitive body 140 and develop an electrostatic latent image on the photosensitive body 140.

The developed toner image is transferred on an intermediate transfer belt 36 forming an image carrier of the intermediate transfer mechanism 30.

The cleaning member 170 is provided with a cleaner blade for wiping toner T left and adhering onto the periphery of the photosensitive body 140 after the above transfer and a receiving part for receiving toner wiped by the cleaner blade.

The intermediate transfer mechanism 30 is provided with a driving roller 31, four driven rollers 32, 33, 34 and 35 and the intermediate transfer belt 36 stretched around these rollers without an end as the image carrier.

The driving roller 31 is rotated at approximately the same peripheral speed as the photosensitive body 140 because a gear not shown and fixed to the end of the driving roller is engaged with a gear for driving not shown of the photosensitive body 140 and therefore, the intermediate transfer belt 36 is circulated at approximately the same peripheral speed as the photosensitive body 140 in a direction shown by an arrow.

The driven roller 35 is arranged in a position in which the intermediate transfer belt 36 is pressed on the photosensitive body 140 by its own tension between the driving roller 31 and the driven roller 35 and a primary transfer part T1 is formed in a part in which the photosensitive body 140 and the intermediate transfer belt 36 are touched under pressure. The driven roller 35 is arranged near to the primary transfer part T1 on the upstream side in a direction in which the intermediate transfer belt 36 is circulated.

An electrode roller not shown is arranged adjacently to the driving roller 31 via the intermediate transfer belt 36 and primary transfer voltage is applied to the intermediate transfer belt 36 via the electrode roller.

The driven roller 32 is a tension roller and presses the intermediate transfer belt 36 by pressure means not shown in the tensile direction of the intermediate transfer belt.

The driven roller 33 is a backup roller forming a secondary transfer part T2. A secondary transfer roller 38 as transfer member is arranged opposite to the backup roller 33 via the intermediate transfer belt 36. The secondary transfer roller 38 can be touched or separated to/from the intermediate transfer belt 36 by a touching/separating mechanism not shown. Secondary transfer voltage is applied to the secondary transfer roller 38.

The driven roller 34 is a backup roller for a belt cleaner 39. The belt cleaner 39 is provided with a cleaner blade 39*a* for coming in contact with the intermediate transfer belt 36 and wiping toner left and adhering onto the periphery and a receiving part 39*b* for receiving toner wiped by the cleaner blade 39*a*. The belt cleaner 39 can be touched or separated to/from the intermediate transfer belt 36 by a touching/separating mechanism not shown.

The intermediate transfer belt 36 is constituted by a conductive layer and a plural-layer belt formed on the conductive layer and provided with a resistive layer pressed on the photosensitive body 140. The conductive layer is formed on an insulating base composed of synthetic resin and primary transfer voltage is applied to the conductive layer via the above electrode roller.

In a process in which the intermediate transfer belt 36 is circulated, a toner image on the photosensitive body 140 is transferred on the intermediate transfer belt 36 in the primary transfer part T1 and the toner image transferred on the intermediate transfer belt 36 is transferred on a sheet (recording material) S such a paper supplied between the intermediate transfer belt and the secondary transfer roller 38 in the secondary transfer part T2.

The recording material S is supplied from a paper feeder 50 to the secondary transfer part T2 at predetermined timing by a pair of gate rollers G. A reference number 51 denotes a paper feeding cassette for laminating and holding recording material S and 52 denotes a pickup roller.

A toner image is transferred on recording material S in the secondary transfer part T2 and fixed by passing a fixing mechanism 60 as fixing member.

The fixing mechanism 60 is provided with a heating roller 61 provided with a heat source and a pressurizing roller 62 pressed on the heating roller, and these rollers 61 and 62 heat the passing recording material S with it pressed between them, melt and fix a toner image on the recording material S.

Recording material S through the fixing mechanism 60 is finally ejected on a sheet receiving part 81 formed on a case

80 of the body of the apparatus through a paper ejecting path 70, however, the image forming apparatus according to the present invention is provided with a reversing path 70' for reversing recording material S which passes the fixing mechanism 60 and returning the recording material S to the transfer part T2 (the secondary transfer part T2) again.

The reversing path 70' is provided with a switch back path 74 having two paper ejecting paths 71 and 72 mutually independent for carrying recording material S which passes the fixing mechanism 60 and reversing the recording material S once carried and a returning path 73 for returning the recording material S reversed from the switch back path 74 toward the secondary transfer part T2 again. Therefore, two sides of the recording material S returned to the secondary transfer part T2 again by the reversing path 70' are reversed and returned to the secondary transfer part T2.

Such an image forming apparatus can also form an image only on the right side (the first side) of recording material S and can also form an image on both sides (the first and second sides which are the right and back sides).

A reference number 90 denotes a control section and the control section constitutes a control section for controlling the whole apparatus.

The outline of the operation of the above whole image forming apparatus is as follows:

(i) When a printing command signal (an image forming signal) from a host computer (a personal computer) not shown and others is input to the control section 90 of the image forming apparatus, the photosensitive body 140, each roller 11 of the developing machines 10 and the intermediate transfer belt 36 are rotated.

(ii) The periphery of the photosensitive body 140 is evenly charged by the charging roller 160.

(iii) Selective exposure L1 according to the image information of a first color (for example, yellow) is applied to the periphery of the evenly charged photosensitive body 140 by the exposure unit 40 and an electrostatic latent image for yellow is formed.

(iv) Only the developing roller of the developing machine 10Y for the first color (for example, yellow) is touched to the photosensitive body 140, hereby, the above electrostatic latent image is developed and a toner image of the first color (for example, yellow) is formed on the photosensitive body 140.

(v) Primary transfer voltage with polarity reverse to polarity for charging the above toner is applied to the intermediate transfer belt 36 and the toner image formed on the photosensitive body 140 is transferred on the intermediate transfer belt 36 in the primary transfer part T1. At this time, the secondary transfer roller 38 and the belt cleaner 39 are respectively separated from the intermediate transfer belt 36.

(vi) After toner left on the photosensitive body 140 is removed by the cleaning member 170, the photosensitive body 140 is decharged by decharging light L2 from decharging member 41.

(vii) The operation in the above (ii) to (vi) is repeated if necessary. That is, the operation for a second color, a third color and a fourth color is repeated according to the contents of the above printing command signal, toner images according to the contents of the printing command signal are superposed and formed on the intermediate transfer belt 36.

(viii) Recording material S is supplied from the paper feeder 50 at predetermined timing and immediately before or after the end of the recording material S reaches the secondary transfer part T2 (in short, at timing at which toner images on the intermediate transfer belt 36 are transferred in a desired position on the recording material S), the secondary transfer roller 38 is pressed on the intermediate transfer belt 36, secondary transfer voltage is applied and toner images on the intermediate transfer belt 36 (basically, a full color image obtained by superposing toner images in four colors) are transferred on the recording material S. The belt cleaner 39 is touched to the intermediate transfer belt 36 and toner left on the intermediate transfer belt 36 after secondary transfer is removed.

(ix) When recording material S passes the fixing mechanism 60, a toner image is fixed on the recording material S and afterward, the recording material S is carried toward a predetermined position (toward the sheet receiving part 81 in case double-sided printing is not executed and toward the returning path 73 through the switch back path 74 in the case of double-sided printing).

That is, if an image is formed only on the right side (a first side), an image is transferred on the first side of recording material S fed from the paper feeder 50 in the secondary transfer part T2 and after the image is fixed by the fixing mechanism 60, the recording material is ejected on the sheet receiving part 81 through the paper ejecting path 71 or 72.

If an image is formed on both sides (the first and second sides), an image is transferred on the first side of recording material S fed from the paper feeder 50 in the secondary transfer part T2, after the image is fixed by the fixing mechanism 60, the recording material is once carried into the paper ejecting path 71 or 72 (the switch back path 74), is reversed, is returned to the secondary transfer part T2 again at predetermined timing by a pair of gate rollers G through the returning path 73 and an image is also transferred on the second side. Afterward, the image is also fixed on the second side by the fixing mechanism 60 and ejected on the sheet receiving part 81 through the paper ejecting path 71 or 72.

As recording material S which once passes the fixing mechanism 60 is returned to the secondary transfer part T2 again if an image is formed on both sides as described above, the optimum value of transfer voltage (secondary transfer voltage in this case) in transfer on the first side and the optimum value of transfer voltage in transfer on the second side are greatly different.

As recording material S already passes the fixing mechanism 60 once in transfer on the second side though the recording material S does not pass the fixing mechanism 60 yet in transfer on the first side, the fixing mechanism 60 heats recording material S and fixes a toner image on the recording material S, not only the hygroscopic degree of recording material S immediately after the recording material passes the fixing mechanism 60 approaches substantially zero but the recording material S is in an extremely sensitive state to the effect of humidity.

In this embodiment, there are provided: a timer 93 for measuring elapsed time since of recording material S and the recording material S, in which a toner image is transferred on the first side, passes the fixing mechanism 60 until the transfer of a toner image on the second side is started when an image is formed on the first and second sides of recording material S; and a environment detecting section 92 for detecting humidity and temperature are provided. The image forming apparatus is constituted so that the above control section 90 determines transfer voltage when a toner image is transferred on the second side of recording material S based upon both of the elapsed time after fixing on the first side which is measured by the timer 93 and the temperature and humidity respectively detected by the environment detecting section 92. As the higher temperature and humidity are and the longer elapsed time is, the larger the hygroscopic degree of recording material S is and the smaller the resistance value is, transfer voltage is set to a relatively small value, and as the lower temperature and humidity are and the shorter elapsed time is, the smaller the hygroscopic degree of recording material S is and the larger the resistance value is, transfer voltage is set to a relatively large value.

The image forming apparatus according to the present invention is constituted so that transfer voltage when a toner image is transferred on the first side of recording material S is determined based upon temperature and humidity respectively detected by the environment detecting section 92. As the higher temperature and humidity are, the larger the hygroscopic degree of recording material S is, transfer voltage is set to a relatively small value, and as the lower temperature and humidity are, the smaller the hygroscopic degree of recording material S is, transfer voltage is set a relative large value.

The timer 93 can be constituted by a timer built in the control section 90 and the above elapsed time can be measured by providing a detector 93 for detecting the rear end of recording material S on the downstream side of the fixing mechanism 60 for example and measuring elapsed time since the detector 93 detects the rear end of the recording material S.

The environment detecting section 92 can be provided in a suitable place of the apparatus and in this embodiment, the above member is provided near to the paper feeding cassette 51. The environment detecting section 92 may be constituted by a temperature and humidity sensor for detecting temperature and humidity.

According to the above image forming apparatus, the following action and effect can be obtained:

(a) Since there are provided: the intermediate transfer belt 36 as an image carrier on the surface of which a toner image is formed; the secondary transfer roller 38 as transfer member for forming the transfer part T2 between the secondary transfer roller and the intermediate transfer belt 36, applying transfer voltage and transferring the toner image on the surface of the intermediate transfer belt 36 on recording material S; the fixing mechanism 60 as fixing member for heating the recording material S on which the toner image is transferred by the secondary transfer roller 38, passing it and fixing the toner image on the recording material S; and the reversing path 70' through which the recording material S can be returned to the transfer part T2 again by reversing the two sides of the recording material S which passes the fixing mechanism 60, recording material S on the first side of which a toner image is transferred, which passes the fixing mechanism 60 and on which the toner image is fixed can be returned to the transfer part T2 again through the reversing path 70', a toner image can be also transferred and fixed on the second side. That is, an image can be formed on both sides of recording material S.

Since the image forming apparatus equivalent to this embodiment is provided with: the timer 93 for measuring elapsed time since recording material S, on the first side of which a toner image is transferred, passes the fixing mechanism 60 until the transfer of a toner image on the second side is started when an image is formed on the first and second sides of recording material S; the humidity detector 92 for detecting humidity; and the control section 90 for determining transfer voltage when a toner image is transferred on the second side of recording material S based upon the above elapsed time after fixing on the first side which is measured by the timer 93 and humidity detected by the humidity detector 92, transfer voltage when a toner image is transferred on the second side of recording material S can be set to an optimum value according to the hygroscopic degree of recording material S which may rapidly vary depending upon the above elapsed time and humidity by the control section 90.

That is, transfer voltage when a toner image is transferred on the second side can be set to an optimum value according to the state of recording material S the hygroscopic degree immediately after passing of which approaches substantially zero when recording material passes the fixing mechanism 60 and which is in an extremely sensitive state to the effect of humidity.

Therefore, according to the image forming apparatus equivalent to this embodiment, when an image is formed on the second side of recording material S, suitable transfer voltage is also obtained and as a result, a fine image can be also formed on the second side.

(b) As the image forming apparatus equivalent to this embodiment is constituted so that the control section 90 also determines transfer voltage when a toner image is transferred on the first side of recording material S based upon humidity detected by the humidity detector 92, transfer voltage when a toner image is transferred on the first side can be also set to an optimum value.

In addition, as humidity detector required for determining transfer voltage when a toner image is transferred on the first side and humidity detector required for determining transfer voltage when a toner image is transferred on the second side are unified by one humidity detector 92, effect that one humidity detector has only to be provided is obtained.

(c) As the intermediate transfer belt 36 as an image carrier is an image carrier on which toner images in plural colors may be superposed by being rotated plural times and toner images in plural colors superposed on the image carrier are collectively transferred on recording material S in the secondary transfer part T2, not only a monochrome image but a full color image can be formed on the first and second sides of recording material S.

If as in the above image forming apparatus, the image carrier 36 is an image carrier on which toner images in plural colors may be superposed by being rotated plural times and toner images in plural colors superposed on the image carrier 36 are collectively transferred on recording material S in the above transfer part T2, elapsed time since the recording material S, on the first side of which a toner image is transferred, passes the fixing mechanism 60 until the transfer of a toner image on the second side is started remarkably differs according to difference in the rotating speed of the image carrier 36 between a case that a monochrome toner image is transferred on the second side of recording material S and a case that toner images in plural colors superposed on the image carrier 36 are collectively transferred and therefore, the hygroscopic degree of recording material S may also remarkably differ.

In the meantime, according to the image forming apparatus equivalent to this embodiment, suitable transfer voltage when a toner image is transferred on the second side of recording material S is also obtained in such a case and as a result, a fine monochrome image or a fine full color image can be also formed on the second side.

(d) As the humidity detector 92 is constituted by temperature and humidity detector for also detecting temperature and the control section 90 is control section for determining transfer voltage based upon temperature and humidity respectively detected by the environment detecting section 92 and the above elapsed time, the above transfer voltage (transfer voltage when a toner image is transferred on the first and/or second sides/side of recording material) can be more securely set to an optimum value.

A second embodiment according to the present invention will be described below. The second embodiment is different from the first embodiment in that environment detecting section 92' is provided opposite to a returning path 73 of a reversing path 70' and is the same as the first embodiment in the other points. The environment detecting section 92' may be also provided separately from the environment detecting section 92 in the first embodiment and may be also provided in place of the environment detecting section 92 in the first embodiment. If the environment detecting section 92' is provided separately from the environment detecting section 92, the environment detecting section 92 constitutes a temperature and humidity detector required for determining transfer voltage when a toner image is transferred on the first side. The environment detecting section 92' is required to be provided in a position in which the carriage of recording material S is not prevented. That is, it means the humidity detector is provided opposite to the reversing path that the humidity detector is provided near to the reversing path.

According to this embodiment, the following action and effect are obtained in addition to the action and effect in the above first embodiment:

That is, as the environment detecting section 92' is provided opposite to the reversing path 70, transfer voltage when a toner image is transferred on the second side of recording material S can be more securely set to an optimum value according to the hygroscopic degree which may rapidly vary of the recording material S based upon the temperature and humidity of the reversing path 70 which is a path for recording material S which passes a fixing mechanism 60 once when an image is formed on both sides and elapsed time after the recording material passes the fixing mechanism 60.

If the environment detecting section 92' is provided separately from the humidity detector 92 required for determining transfer voltage when a toner image is transferred on the first side, both transfer voltage when a toner image is transferred on the first and second sides of recording material S can be more securely set to an optimum value, compared with the first embodiment or a case that the environment detecting section 92' is shared as a member required for determining both transfer voltage when a toner image is transferred on the first and second sides.

The embodiments of the present invention are described above, however, the present invention is not limited to the above embodiments and may be suitably varied within a range of the purpose of the present invention.

For example, 1) in the above embodiments, the image carrier is constituted by the intermediate transfer belt 36 and the transfer part is the secondary transfer part T2, however, the present invention is not limited to the above. The present invention can be also applied to an image forming apparatus constituted so that an image carrier is constituted by the photosensitive body 140 and a toner image is directly transferred on recording material S from the photosensitive body 140 for example.

2) The environment detecting section 92 or 92' may be constituted as a detector for detecting at least humidity.

According to the first and second embodiments, suitable transfer voltage is also obtained when an image is formed on the second side of recording material and as a result, a fine image can be also formed on the second side.

Further, transfer voltage when a toner image is transferred on the first side can be also set to an optimum value. In addition, effect that one humidity detecting means has only to be provided is obtained.

Still further, a fine monochrome image or a fine full color image can be also formed on the second side.

Third and fourth embodiments according to the present invention will be described below. As described above, if toner images (color images) in plural colors superposed on the surface of the image carrier 36 are collectively transferred on recording material S, a range of transfer conditions on which a satisfactory transfer condition is obtained is very small because superposed toner images in plural colors are collectively transferred on the recording material S. Therefore, it is influenced not only by environment and the type of recording material but by the dispersion of the resistance of a member forming a path in which transfer voltage is supplied, particularly the secondary transfer roller 38 which is transfer member whether a transfer condition is satisfactory or not.

In these embodiments, environment detecting section 92 is provided and a constant current value, the minimum voltage value and/or the maximum voltage value respectively used by the transfer voltage applying member 91 are controlled by the control section 90 based upon temperature and humidity respectively detected by the environment detecting section 92.

The environment detecting section 92 can be provided in a suitable place of the apparatus and in this embodiment, the above member is provided near to the paper feeding cassette 51 or to the returning path 73 of the reversing path 70' (see a reference number 92'). The environment detecting section 92 may be constituted by a temperature and humidity sensor for detecting temperature and humidity.

According to the above image forming apparatus, the following action and effect can be obtained:

(a) As there are provided: the image carrier 36 on the surface of which toner images in plural colors are superposed; and the transfer member 38 for forming the transfer part T2 between the transfer member and the image carrier 36 and collectively transferring the toner images in plural colors on recording material S, a color image can be formed with simple constitution, compared with an apparatus of a type that recording material is wound on a drum.

(b) As there are provided: the transfer voltage applying member 91 for applying transfer voltage under a constant current value and the minimum voltage value of which is limited to the transfer member 38; the environment detecting section 92 for detecting temperature and humidity; and the control section 90 for controlling the constant current value and the minimum voltage value respectively used by the transfer voltage applying member 91 based upon temperature and humidity detected by the environment detecting section 92, a satisfactory transfer condition is obtained independent of environment, that is, temperature and humidity, the type of recording material and further, the dispersion of the resistance of a member forming a path in which transfer voltage is supplied, particularly the secondary transfer roller 38.

Figure 2:
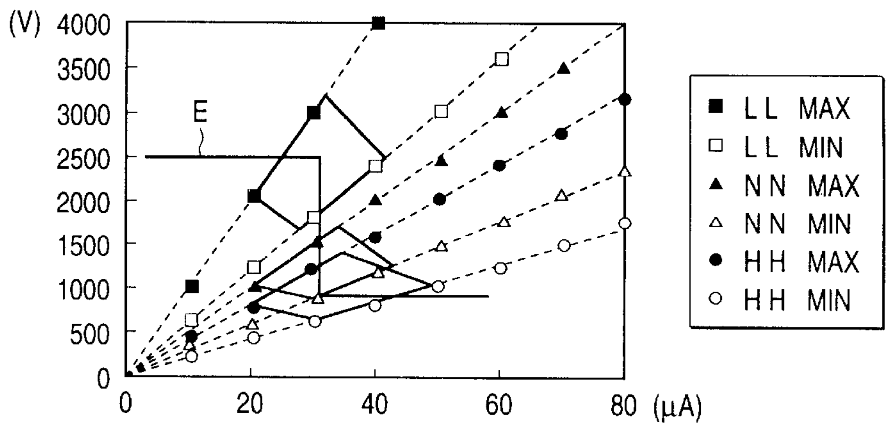
FIG. 2 shows an example for comparison and is a V-I characteristic drawing in case a monochrome toner image is transferred.
Figure 3:
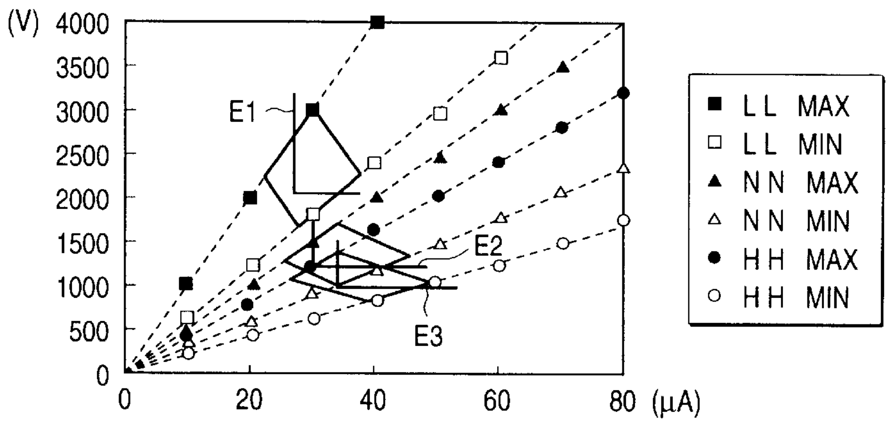
FIG. 3 is a V-I characteristic drawing in a third embodiment of the image forming apparatus according to the present invention.
Figure 4:
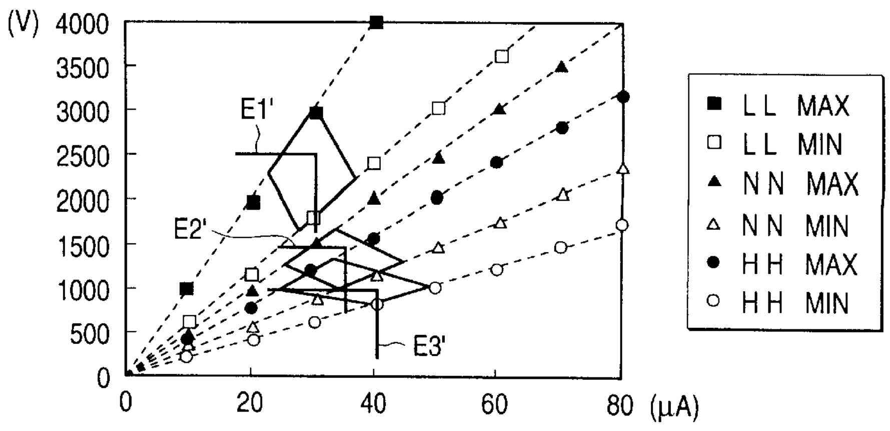
FIG. 4 is a V-I characteristic drawing in a fourth embodiment of the image forming apparatus according to the present invention.

FIG. 2 is a characteristic drawing showing relationship between transfer voltage and transfer current (V-I characteristic drawing) in connection with the related art disclosed in Unexamined Japanese Patent Publication No. 2-285377A, in which transfer voltage is controlled under constant current with the minimum voltage and the maximum voltage limited, FIG. 3 is a V-I characteristic drawing in a third embodiment according to the present invention and FIG. 4 is a V-I characteristic drawing in a fourth embodiment according to the present invention.

In these drawings, the x-axis shows transfer current (unit: μA) and the y-axis shows transfer voltage (unit: V).

A broken line shows a load when the resistance is maximum and minimum in each environment, that is, in low-temperature and low-humidity environment (LL environment), normal-temperature and normal-humidity environment (NN environment) and high-temperature and high-humidity environment (HH environment). Therefore, in a graph, six broken lines showing a load are drawn.

The reason why the state of a broken line showing a load greatly differs depending upon each environment is that the resistance of recording material such as paper and the transfer roller changes because of moisture absorption.

Also, the reason why broken lines showing a load differ as described above even in the same environment (for example, LL MAX and LL MIN) is that the resistance of the transfer roller widely varies in manufacture and the resistance of recording material widely varies depending upon the type such as thick paper, thin paper, a postcard and an envelope of the recording material.

Generally, when transfer voltage (current) is too small or too large, transfer failure occurs and there exists a range (a range in which transfer efficiency is satisfactory) of transfer voltage (current) in which a satisfactory transfer condition is obtained. The above range is an area in which transfer is satisfactory and shown by a quadrangle.

Therefore, if a control line of transfer voltage is within the above area in which transfer is satisfactory (a range in a quadrangle), a satisfactory transfer condition is obtained.

First, an example for comparison shown in FIG. 2 will be described.

FIG. 2 shows an area in which transfer is satisfactory in case a monochrome toner image is transferred.

As clear from FIG. 2, as an area in which transfer is satisfactory in each environment is relatively large in the case of a monochrome, a satisfactory transfer condition can be obtained by one control line E.

However, as a range of areas in which transfer is satisfactory in each environment is narrow as shown in FIGS. 3 and 4 if a color image (that is, superposed toner images in plural colors) is collectively transferred, it is difficult to obtain a satisfactory transfer condition by one control line.

In the third and fourth embodiments, transfer voltage is controlled as follows:

In the third embodiment, transfer voltage is controlled based upon output from environment detecting section 92 using a high voltage power supply the minimum voltage of which is limited by a constant-current source as follows: (see FIG. 3)

In low-temperature and low-humidity environment (LL), a control current value (a constant current value) is set to 25 μA and a control voltage value (the minimum voltage value) is set to 2000 V. The control line is shown as E1 in FIG. 3.

In normal-temperature and normal-humidity environment (NN), a control current value (a constant current value) is set to 30 μA and a control voltage value (the minimum voltage value) is set to 1200 V. The control line is shown as E2 in FIG. 3.

In high-temperature and high-humidity environment (HH), a control current value (a constant current value) is set to 35 μA and a control voltage value (the minimum voltage value) is set to 900 V. The control line is shown as E3 in FIG. 3.

In the fourth embodiment, transfer voltage is controlled based upon output from the environment detecting section 92 using a high voltage power supply the maximum voltage of which is limited by a constant-current source as follows: (see FIG. 4)

In low-temperature and low-humidity environment (LL), a control current value (a constant current value) is set to 30 μA and a control voltage value (the maximum voltage value) is set to 2500 V. The control line is shown as E1' in FIG. 4.

In normal-temperature and normal-humidity environment (NN), a control current value (a constant current value) is set to 35 μA and a control voltage value (the maximum voltage value) is set to 1500 V. The control line is shown as E2' in FIG. 4.

In high-temperature and high-humidity environment (HH), a control current value (a constant current value) is set to 40 μA and a control voltage value (the maximum voltage value) is set to 1000 V. The control line is shown as E3' in FIG. 4.

The embodiment and examples of the present invention are described above, however, the present invention is not limited the above embodiment or the above examples and may be suitably varied within a range of the purpose of the present invention.

For example, in the above embodiment, the image carrier is constituted by the intermediate transfer belt 36 and the transfer part is the secondary transfer part T2, however, the present invention is not limited to these. For example, the present invention can be also applied to a case that an image carrier is constituted by a photosensitive body and toner in plural colors superposed on the photosensitive body is collectively transferred on recording material.

According to the third and fourth embodiments, a satisfactory transfer condition is obtained independent of environment, while adopting a constitution that toner images in plural colors superposed on the surface of the image carrier are collectively transferred on recording material.

Figure 5:
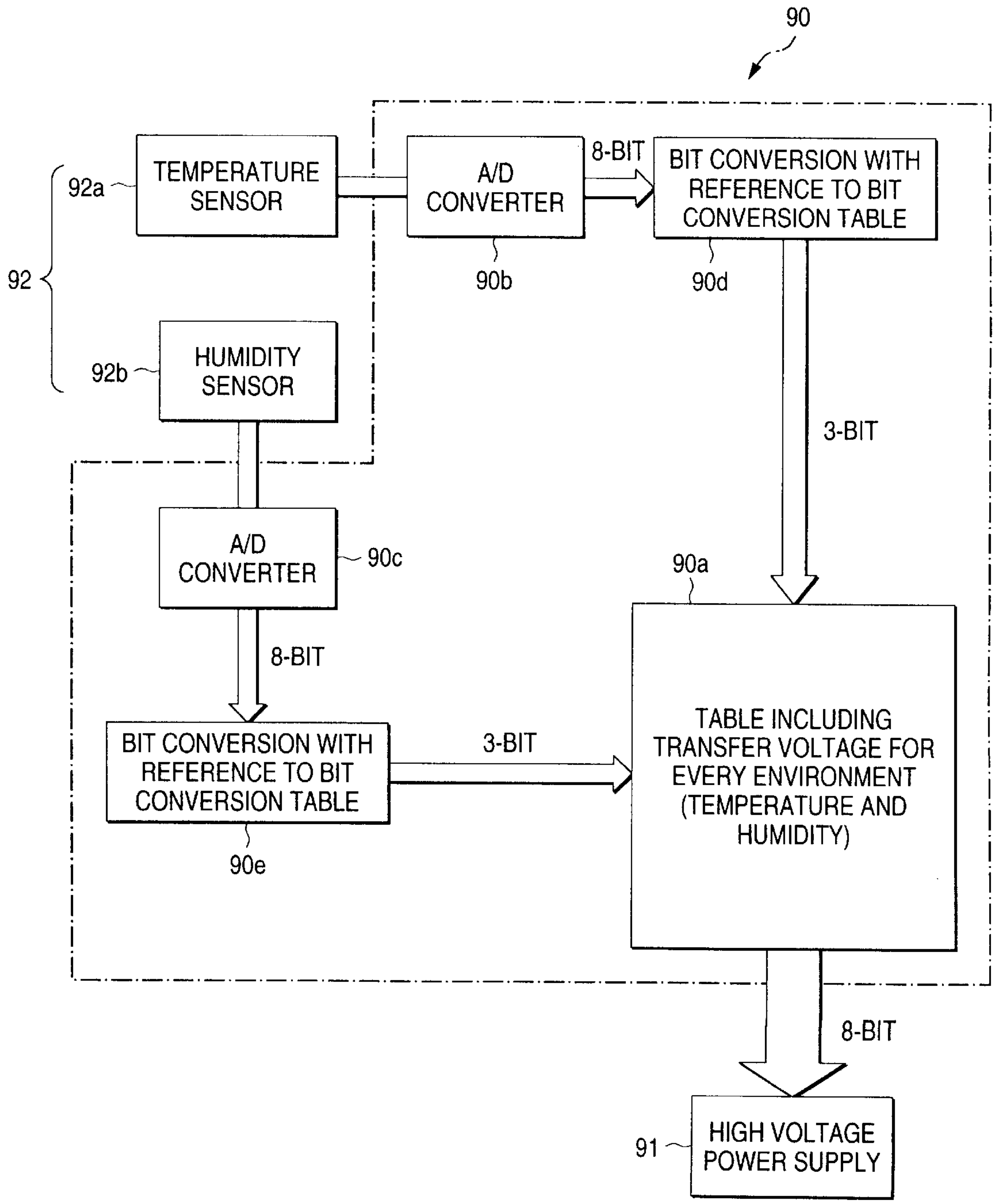
FIG. 5 is a block diagram showing an essential part of the image forming apparatus according to the present invention.

A fifth embodiment according to the present invention will be described below. In this embodiment, as shown in FIG. 5, there are provided: a environment detecting section 92 provided with a temperature detector 92*a* and a humidity detector 92*b*; and a control section 90 provided with: a table 90*a* in which proper transfer voltage according to temperature and humidity (that is, ambient temperature and humidity) respectively detected by the environment detecting section 92 is described; an A/D converter 90*b* for converting an analog signal output by the temperature detector 92*a* to a digital signal; an A/D converter 90*c* for converting an analog signal output by the humidity detector 92*b* to a digital signal; and bit converters 90*d* and 90*e* for reducing and outputting the number of bits of the digital signal from these A/D converters 90*b* and 90*c* by referring to a bit converting table not shown are provided to the control section 90. Proper transfer voltage in the table 90*a* is selected based upon output by the bit converter 90*d* and 90*e* and the selected transfer voltage is applied to the transfer member (the secondary transfer roller 38).

The control section 90 selects proper transfer voltage described in the table 90*a*, that is, a constant current value, the minimum voltage value and/or the maximum voltage value respectively used by the transfer voltage applying member 91 based upon temperature and humidity respectively detected by the environment detecting section 92.

For primary transfer voltage, the similar method to the above method of determining secondary transfer voltage can be adopted. In this embodiment, the above method is adopted and a table not shown for selecting proper primary transfer voltage according to temperature and humidity is also provided.

The environment detecting section 92 can be provided in a suitable place of the apparatus and in this embodiment, it is provided near to the paper feeding cassette 51 or to the returning path 73 of the reversing path 70' (referring to a reference number 92'). The environment detecting section 92 can be constituted by a temperature and humidity sensor for detecting temperature and-humidity.

The A/D converters 90*b* and 90*c* convert an analog signal obtained from the environment detecting section 92 to an 8-bit digital signal.

The bit converter 90*d* and 90*e* are provided with their own bit converting table, convert the number of bits of a digital signal from the A/D converters 90*b* and 90*c* to 3-bit by referring to the above bit converting table and output them. In the bit converting table, data corresponding to a nonlinear system is stored.

According to the above image forming apparatus, the following action and effect are obtained:

As there are provided: the temperature detector 92*a* for detecting temperature; the humidity detector 92*b* for detecting humidity; and the control section 90 including: the table 90*a* in which proper transfer voltage according to temperature and humidity respectively detected by these detector is described; the A/D converter 90*b* for converting an analog signal output by the temperature detector 92*a* to a digital signal; the A/D converter 90*c* for converting an analog signal output by the humidity detector 92*b* to a digital signal; and the bit converter 90*d* and 90*e* for reducing the number of bits of the digital signal from these A/D converters 90*b* and 90*c* to 3-bit by referring to the bit converting table, and as the control section 90 selects proper transfer voltage in the table 90*a* based upon the output of the bit converter 90*d* and 90*e* and applies the selected transfer voltage to the transfer member, transfer is executed by the transfer member using proper transfer voltage according to temperature and humidity respectively detected by the environment detecting section 92.

Therefore, a satisfactory transfer condition is obtained according to the state of temperature and humidity and as a result, a satisfactory color image is obtained.

Further, as the bit converter 9od and 90*e* do not simply reduce and output the number of bits of a digital signal from the A/D converters 90*b* and 90*c* but reduce and output it by referring to the bit converting table, proper transfer voltage according to temperature and humidity is precisely selected by storing data corresponding to a nonlinear system in the bit converting table without increasing the capacity of the table even in the nonlinear system.

That is, according to the image forming apparatus, a satisfactory transfer condition is obtained according to the state of temperature and humidity without increasing the capacity of the table.

First, an example for comparison will be described.

Figure 6:
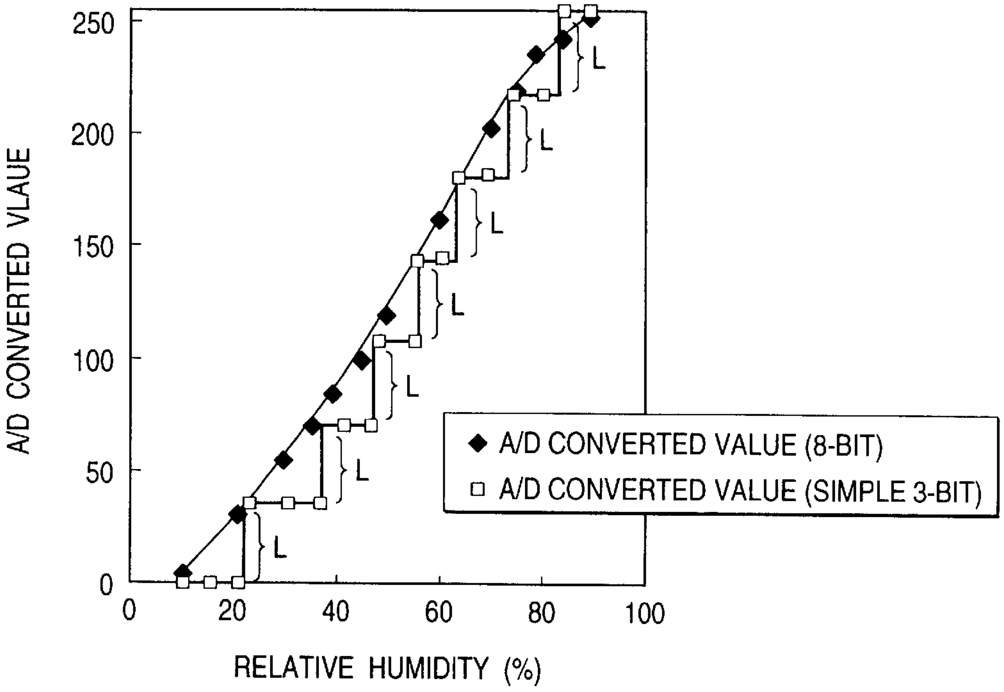
FIG. 6 shows an example for comparison for converting bits.

FIG. 6 shows an example of the bit conversion of the related art in which A/D conversion is executed with high resolution (for example, 8-bit) and a table including only a high order few bits, for example only high order 3-bit is generated.

A black quadrangle in FIG. 6 shows a result obtained by converting an analog signal from the temperature or humidity sensor 92*a* or 92*b* to an 8-bit digital signal by the A/D converter, that is, an example of a value converted from analog to digital.

Also, a white quadrangle shows a result obtained by simply converting the above 8-bit to 3-bit.

In such technique, as 8-bit are simply converted to 3-bit and an interval L between each conversion in the direction of the y-axis (in the direction of values converted from analog to digital) is equal as shown in FIG. 6, an error of detection is increased in a nonlinear system.

Figure 7:
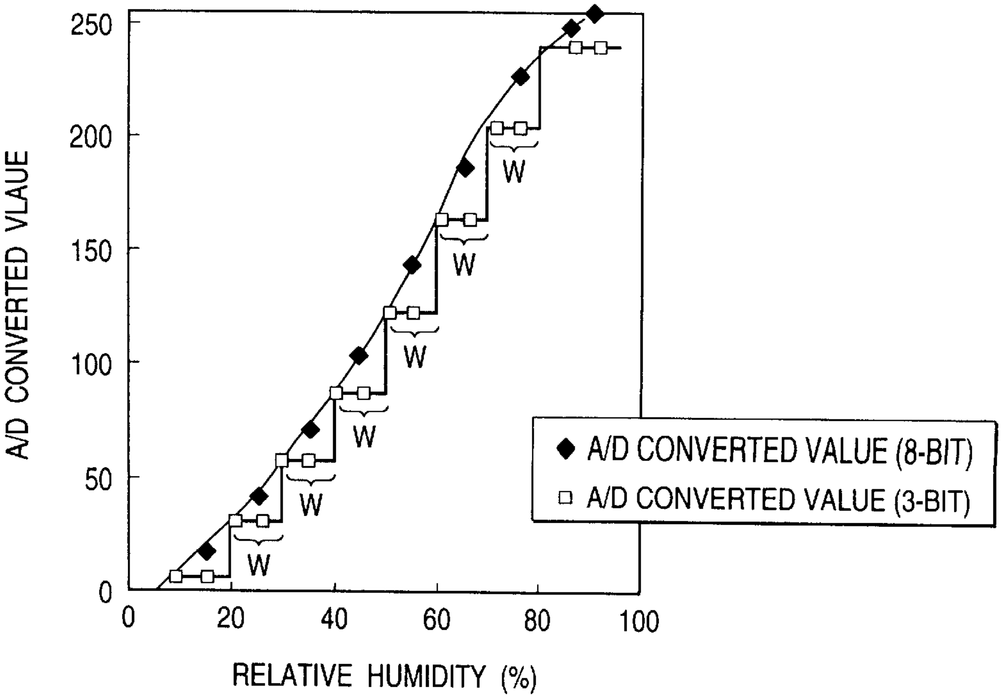
FIG. 7 shows the conversion of bits in a fifth embodiment of the image forming apparatus according to the present invention.

FIG. 7 shows one example of the bit conversion by the above bit converter 90*d* or 90*e* according to the fifth embodiment of the present invention.

A black quadrangle in FIG. 7 shows a result obtained by converting an analog signal from a temperature or humidity sensor 92*a* or 92*b* to an 8-bit digital signal by an A/D converter, that is, an example of a value converted from analog to digital.

A white quadrangle shows a result obtained by converting the above 8-bit to 3-bit using a bit converting table.

As clear from FIG. 7, according to this example, as an interval W between each conversion in the direction of the x-axis (in the direction of the relative variation of humidity) is equal, an error of detection is fixed even in a nonlinear system and an error of detection can be prevented from being increased though 8-bit are converted to 3-bit.

That is, in the bit converting table in this example, data corresponding to a nonlinear system is stored to convert bits as described above.

Figure 8:
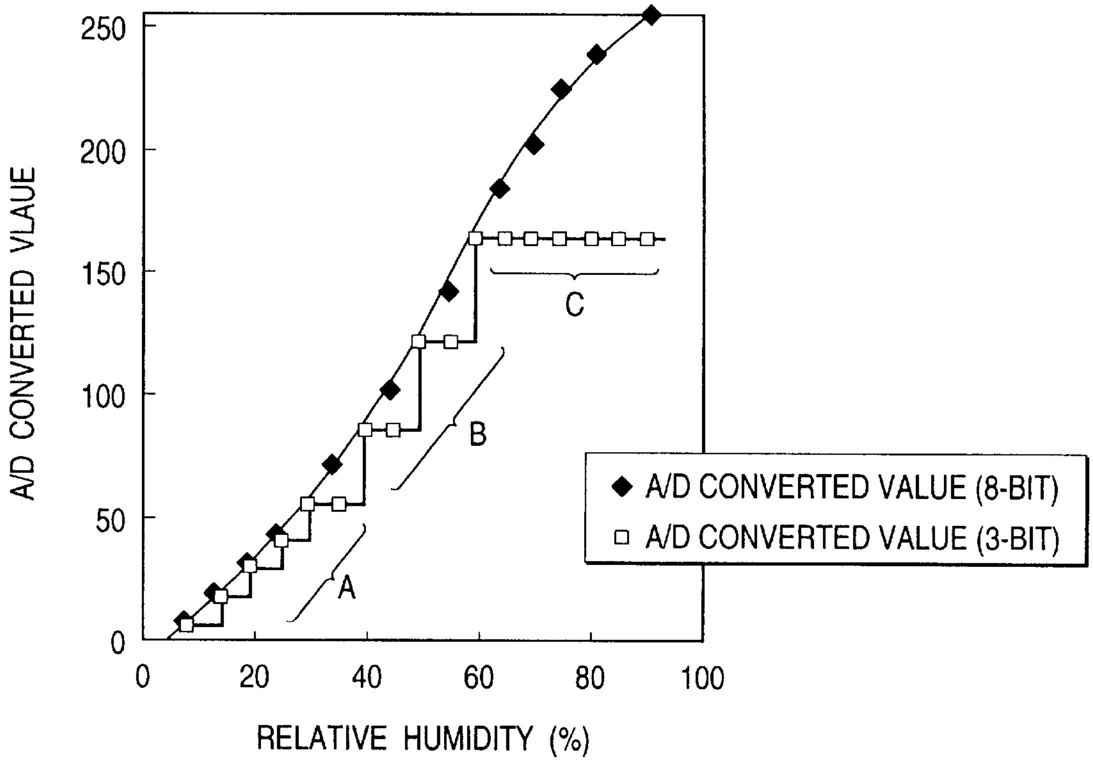
FIG. 8 shows the conversion of bits in a sixth embodiment of the image forming apparatus according to the present invention.

FIG. 8 shows an example of the bit conversion by the above bit converter 90*d* or 90*e* of a sixth embodiment of the present invention.

A black quadrangle in FIG. 8 shows an example of a result obtained by converting an analog signal from a temperature or humidity sensor 92*a* or 92*b* to an 8-bit digital signal by an A/D converter, that is, a value converted from analog to digital.

A white quadrangle shows a result obtained by converting the above 8-bit to 3-bit using a bit converting table.

As clear from FIG. 8, this example is constituted so that in an area A in which high detection precision is required, a result of detection showing high precision is obtained. This example is constituted so that in an area B in which normal detection precision has only to be obtained, detection precision equal to that in the above first example is obtained and constituted so that in an area C in which high detection precision is not required so much, a detection error to some extent is allowed.

That is, in the bit converting table in this example, data corresponding to a nonlinear system is stored to convert bits as described above.

According to the sixth embodiment, the selection suitable for an actual situation of transfer voltage is enabled.

According to the fifth and sixth embodiments, a satisfactory transfer condition is obtained according to the state of temperature and humidity without increasing the capacity of the table.

The third to sixth embodiments are described as techniques suitable for a color image forming apparatus, however, similar action and effect can be attained of course with respect to a monochrome image forming apparatus.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An image forming apparatus for forming an image on both of a first side and a second side which are the right side and the back side of a recording material, comprising:

an image carrier on a surface of which a toner image is formed;

a transfer member that forms a transfer part between the transfer member and the image carrier to transfer the toner image on the image carrier onto the recording material;

a transfer voltage applying section that applies a transfer voltage to the transfer member;

a fixing member that heats the recording material, on which the toner image is transferred by the transfer member, passed therethrough to fix the toner image on the recording material;

a reversing path that reverses the two sides of the recording material passed through the fixing member and returns the reversed recording material to the transfer part again;

a timer section that measures elapsed time since the recording material, on the first side of which a toner image is transferred, passes through the fixing member until the transfer of a toner image on the second side is started when an image is formed on the first and second sides of the recording material;

a humidity detecting section that detects humidity; and a control section that selects transfer voltage to transfer a toner image on the second side of the recording material based upon elapsed time measured by the timer section and humidity detected by the humidity detecting section.

2. The image forming apparatus as set forth in claim 1, wherein the control section also selects the transfer voltage to transfer a toner image on the first side of the recording material based upon humidity detected by the humidity detecting section.

3. The image forming apparatus as set forth in claim 1, wherein the humidity detecting section is located opposite to the reversing path.

4. The image forming apparatus as set forth in claim 3, further comprising a second humidity detecting section separately provided from the humidity detecting section, and wherein the control section selects said transfer voltage for transferring a toner image on the first side of the recording material based upon humidity detected by the second humidity detecting section.

5. The image forming apparatus as set forth in claim 1, wherein toner images in plural colors superposed on the surface of the image carrier by rotating the image carrier in plural times, and the superposed toner images in plural colors are collectively transferred onto the recording material at the transfer part.

6. The image forming apparatus as set forth in claim 1, further comprising a temperature detecting section that detects a temperature, and wherein the control section selects the transfer voltage based upon temperature detected by the temperature detecting section in addition to the elapsed time and the humidity.

7. The image forming apparatus as set forth in claim 5, further comprising a temperature detecting section that detects a temperature, wherein the transfer voltage applying section applies the transfer voltage in which at least one of the maximum voltage value and the minimum voltage value is limited under a constant current value to the transfer member, and wherein the control section controls the constant current value and at least one of the maximum voltage value and the minimum voltage value based upon temperature detected by the temperature detecting section and the humidity detected by the humidity detecting section.

8. The image forming apparatus as set forth in claim 5, further comprising:

a temperature detecting section that detects a temperature;

a transfer voltage table including proper transfer voltage values respectively corresponding to the temperature value detected by the temperature detecting section and the humidity value detected by the humidity detecting section;

a first analog-to-digital converter for converting an analog signal output from the humidity detection section into a digital signal;

a second analog-to-digital converter that converts an analog signal output from the temperature detecting section into a digital signal; and a bit conversion section that outputs a digital signal in which bit number of the digital signal output from the first and second analog-to-digital converters is reduced with reference to a bit conversion table, wherein the control section selects a proper transfer voltage value in the transfer voltage table based upon the output of the bit conversion section.

9. The image forming apparatus as set forth in claim 8, wherein the bit conversion table includes data adapted to a nonlinear system environment.

10. The image forming apparatus as set forth in claim 9, wherein the data included in the bit conversion table is configured so as to allow a detection error value corresponding to a required detection precision.

11. The image forming apparatus as set forth in claim 6, wherein the transfer voltage applying section applies transfer voltage in which at least one of the maximum voltage value and the minimum voltage value is limited under a constant current value to the transfer member, and wherein the control section controls the constant current value and at least one of the maximum voltage value and the minimum voltage value based upon the temperature detected by the temperature detecting section and the humidity detected by the humidity detecting section.

12. The image forming apparatus as set forth in claim 6, further comprising:

a transfer voltage table including proper transfer voltage values respectively corresponding to the temperature value detected by the temperature detecting section and the humidity value detected by the humidity detecting section;

a first analog-to-digital converter that converts an analog signal output from the humidity detecting section into a digital signal;

a second analog-to-digital converter that converts an analog signal output from the temperature detecting section into a digital signal; and a bit conversion section that outputs a digital signal in which bit number of the digital signal output from the first and second analog-to-digital converters is reduced with reference to a bit conversion table, wherein the control section selects a proper transfer voltage value in the transfer voltage table based upon the output of the bit conversion section.

13. The image forming apparatus as set forth in claim 12, wherein the bit conversions includes data adapted to a nonlinear system environment.

14. The image forming apparatus as set forth in claim 13, wherein the data included in the bit conversion table is configured so as to allow a detection error value corresponding to a required detection precision.

15. A method of forming an image on a first side and a second side of a material, comprising:

(a) forming an image on an image carrier in response to a control signal;

(b) transferring said image from said image carrier to said first side of said first material in accordance with a fist transfer voltage;

(c) fixing said image on said material; and (d) transferring said image to said second side in accordance with a second transfer voltage, wherein at least one of said first transfer voltage and said second transfer voltage is generated based on a humidity detected proximal to said material and an elapsed time between completing said step (c) and starting said step (d).

16. The method of claim 15, further comprising sequentially applying a plurality of colors to form said image in color on said image carrier.

17. The method of claim 15, wherein said first transfer voltage and said second transfer voltage are applied such that one of a maximum voltage value and a minimum voltage value is limited under a constant current value, and said constant current value and said one of said maximum voltage value and said minimum voltage value are controlled based on said humidity and a temperature detected proximal to said material.

18. The method of claim 15, further comprising detecting a temperature proximal to said material, wherein said first transfer voltage and said second transfer voltage are generated in accordance with said temperature.

19. The method of claim 18, further comprising determining said first transfer voltage and said second transfer voltage in accordance with a table that selects said first transfer voltage and said second transfer voltage based on said detected humidity and said detected temperature.

20. The method of claim 19, further comprising adapting said table to a nonlinear system environment.

21. An image forming apparatus for forming an image on both of a first side and a second side which are the right side and the back side of a recording material, comprising:

an image carrier on a surface of which a toner image is formed;

a transfer member for forming a transfer part between the transfer member and the image carrier to transfer the toner image on the image carrier onto the recording material;

a transfer voltage applying section for applying a transfer voltage to the transfer member;

a fixing member for heating the recording material, on which the toner image is transferred by the transfer member, passed therethrough to fix the toner image on the recording material;

a reversing path for reversing the two sides of the recording material passed through the fixing member and returning the reversed recording material to the transfer part again;

a timer section for measuring elapsed time since the recording material, on the first side of which a toner image is transferred, passes through the fixing member until the transfer of a toner image on the second side is started when an image is formed on the first and second sides of the recording material;

a first humidity detecting section for detecting humidity;

a second humidity detecting section for detecting humidity, separately provided from the humidity detecting section; and a control section for selecting transfer voltage for transferring a toner image on the second side of the recording material based upon elapsed time measured by the timer section and humidity detected by the humidity detecting section, wherein the control section selects said transfer voltage for transferring a toner image on the first side of the recording material based upon humidity detected by the second humidity detecting section.

* * * * *